(12) United States Patent
Lewandowski et al.

(10) Patent No.: US 9,777,342 B2
(45) Date of Patent: Oct. 3, 2017

(54) SEPARATION AND RECOVERY OF XYLOSE USING WEAKLY BASIC ANION EXCHANGE RESINS

(71) Applicant: DUPONT NUTRITION BIOSCIENCES APS, Copenhagen (DK)

(72) Inventors: Jari Lewandowski, Siuntio (FI); Nina Nurmi, Helsinki (FI); Jari Mattila, Kirkkonummi (FI); Kari Laiho, Kirkkonummi (FI); Kati Kekalainen, Rajamaki (FI)

(73) Assignee: DUPONT NUTRITION BIOSCIENCES APS (DK)

(*) Notice: Subject to any disclaimer, the term of this patent is extended or adjusted under 35 U.S.C. 154(b) by 0 days.

(21) Appl. No.: 14/428,490

(22) PCT Filed: Sep. 19, 2013

(86) PCT No.: PCT/EP2013/069473
§ 371 (c)(1),
(2) Date: Mar. 16, 2015

(87) PCT Pub. No.: WO2014/044753
PCT Pub. Date: Mar. 27, 2014

(65) Prior Publication Data
US 2015/0247211 A1      Sep. 3, 2015

Related U.S. Application Data

(60) Provisional application No. 61/703,322, filed on Sep. 20, 2012.

(30) Foreign Application Priority Data

Sep. 20, 2012  (GB) .................................. 1216764.9

(51) Int. Cl.
| | |
|---|---|
| *C13K 13/00* | (2006.01) |
| *B01D 15/18* | (2006.01) |
| *B01D 15/36* | (2006.01) |
| *B01J 41/20* | (2006.01) |
| *C13B 20/14* | (2011.01) |
| *B01J 39/26* | (2006.01) |
| *B01J 41/14* | (2006.01) |
| *B01J 47/04* | (2006.01) |
| *B01J 47/10* | (2017.01) |
| *B01J 41/07* | (2017.01) |
| *B01J 47/011* | (2017.01) |

(52) U.S. Cl.
CPC .......... *C13K 13/002* (2013.01); *B01D 15/185* (2013.01); *B01D 15/362* (2013.01); *B01D 15/363* (2013.01); *B01J 39/26* (2013.01); *B01J 41/07* (2017.01); *B01J 41/14* (2013.01); *B01J 41/20* (2013.01); *B01J 47/011* (2017.01); *B01J 47/04* (2013.01); *B01J 47/10* (2013.01); *C13B 20/14* (2013.01); *C13B 20/146* (2013.01); *C13B 20/148* (2013.01)

(58) Field of Classification Search
CPC .................................................... C13K 13/002
See application file for complete search history.

(56) References Cited

U.S. PATENT DOCUMENTS

| | | | |
|---|---|---|---|
| 4,075,406 A | 2/1978 | Melaja et al. | |
| 5,084,104 A | 1/1992 | Heikkila et al. | |
| 5,998,607 A | 12/1999 | Heikkila et al. | |
| 6,451,123 B1 | 9/2002 | Saska et al. | |
| 6,987,183 B2 | 1/2006 | Heikkila et al. | |
| 7,361,273 B2 * | 4/2008 | Heikkila .............. | B01D 15/363 127/46.2 |
| 2005/0061313 A1 | 3/2005 | Jumppanen et al. | |
| 2008/0041366 A1 | 2/2008 | Wahnon | |

FOREIGN PATENT DOCUMENTS

| | | |
|---|---|---|
| CA | 1230348 | 12/1987 |
| EP | 1384724 | 1/2004 |
| WO | WO-91/03574 | 3/1991 |
| WO | WO-97/49658 | 12/1997 |
| WO | 0227038 A1 | 4/2002 |
| WO | 0227039 A1 | 4/2002 |
| WO | WO-03/080872 | 10/2003 |
| WO | WO-2008/019468 | 2/2008 |

OTHER PUBLICATIONS

International Search Report for PCT App. No. PCT/EP2013/069473 dated Jan. 17, 2014.
Intellectual Property Office Search Report Under Section 17 for Application No. GB1216764.9, dated Jan. 25, 2013.

\* cited by examiner

*Primary Examiner* — Melvin C Mayes
*Assistant Examiner* — Stefanie Cohen

(57) ABSTRACT

The invention relates to a method of separating and recovering xylose from a xylose-containing plant-based solution. The method is performed in a chromatographic separation system, which comprises one or more weak base anion exchange resins and optionally one or more other resins selected from strong acid cation exchange resins and weak acid cation exchange resins, by passing the solution through the separation system, followed by recovering at least one fraction enriched in xylose. Optionally, a rhamnose fraction may also be recovered.

25 Claims, No Drawings

SEPARATION AND RECOVERY OF XYLOSE USING WEAKLY BASIC ANION EXCHANGE RESINS

CROSS REFERENCE TO RELATED APPLICATION

This application claims priority to PCT Application No. PCT/EP2013/069473 filed on Sep. 19, 2013, which claims priority to Great Britain Patent Application No. 1216764.9 filed on Sep. 20, 2012, and U.S. Provisional Patent Application No. 61/703,322 filed on Sep. 20, 2012, each of which is herein incorporated by reference in its entirety.

FIELD OF THE INVENTION

The present invention relates to a method of separating and recovering xylose and optionally other sugars, such as rhamnose, from xylose-containing plant-based solutions. The method in accordance with the invention is based on the use of weak base anion exchange resins for the separation, optionally in combination with other resins.

BACKGROUND OF THE INVENTION

WO 03/080872 A1 discloses a chromatographic separation process for separating sugars, sugar alcohols, other carbohydrates and mixtures thereof from plant-based solutions as well as the separation of sugars and sugar alcohols from each other with weak base anion exchange resins. The plant-based solutions used as the feed in the separation may be biomass hydrolysates, molasses and vinasse solutions and process streams like xylose, sucrose, glucose and fructose streams, for example. It is recited that a weak acid cation exchange resin and/or a strong acid cation exchange resin may also be used in the chromatographic separation. The examples of said document show good separation of rhamnose and the recovery of rhamnose-enriched fractions with weak base anion exchange resins. It is also recited in the examples that said resin separates glycerol and inositol from betaine and maltose from glucose, for example. The examples of said document do not disclose the recovery xylose-enriched fractions with weak base anion exchange resins.

US 2008/0041366 A1 discloses a process for separating organic acids and/or salts thereof from an aqueous sugar stream by passing the stream through one or more beds of anion exchange resins. The sugar stream may be a hydrolysate of lignocellulosic feedstock, comprising sugars selected from xylose, glucose, arabinose, galactose, mannose and combinations thereof. The anion exchange resin may be a weak base anion exchange resin. One or more product streams comprising organic acids and/or salts thereof are recovered. Furthermore, a sugar stream substantially free of mineral acids and organic acids is obtained.

WO 02/27038 A1 discloses the use of a weak acid cation exchange resin for chromatographic separation of carbohydrates, especially for the separation of hydrophobic saccharides, such as deoxy, methyl and anhydro sugars and anhydrosugar alcohols from more hydrophilic saccharides. The feeds for the separation may be for example xylose, sucrose, starch or maltose process streams. The examples show good separation of rhamnose, separation of sucrose from monosaccharides, separation of fructose from oligosaccharides, and the separation of sodium chloride, betaine, erythritol and inositol, for example.

WO 02/27039 A1 discloses a method for recovering a monosaccharide selected from rhamnose, arabinose, xylose and mixtures thereof from feeds such as hemicellulose hydrolysates by a multistep chromatographic process, where a weak acid cation exchange resin is used in at least one step of the multistep process. It is recited that a strong acid cation exchange resin may also be used in the separation. The examples show good separation of rhamnose with weak acid cation exchange resins. The examples also show the separation of xylose with strong acid cation exchange resins.

Furthermore, the separation of xylose with strong acid cation exchange resins is disclosed for example in U.S. Pat. No. 4,075,406, WO 97/49658 and U.S. Pat. No. 5,998,607. U.S. Pat. No. 4,075,406 discloses the separation of xylose from xylan-containing raw material, such as birch wood, corn cobs and cotton seed hulls. WO 97/49658 discloses the separation of xylose and xylonic acid from Mg-sulphite cooking liquor, whereafter the fraction containing xylose and xylonic acid is subjected to reduction to obtain xylitol. U.S. Pat. No. 5,998,607 also discloses the separation of xylose together with xylonic acid from a sulphite cooking liquor, followed by the separation of xylose and xylonic acid from each other and reduction thereof to xylitol.

However, the methods described above, such as those based on the use of strong acid action exchange resins, have not always provided xylose with the required yields and purities. Consequently, there is still need for improved xylose recovery methods.

BRIEF DESCRIPTION OF THE INVENTION

An object of the present invention is to provide an improved method for separating and recovering xylose and optionally other sugars, such as rhamnose from plant-based solutions. The objects of the invention are achieved by a method which is characterized by what is stated in the independent claim. The preferred embodiments of the invention are disclosed in the dependent claims.

Surprisingly, it has been found that significantly improved xylose yields and purities are achieved by using weak base anion exchange resins for the separation and recovery of xylose, optionally in combination with strong acid cation exchange resins or weak acid cation exchange resins.

DEFINITIONS RELATING TO THE INVENTION

The term "recover" in connection with the present invention refers to withdrawing or taking out a desired fraction from a chromatographic separation system.

The term "a fraction enriched in xylose" or "a xylose fraction" refers to a fraction recovered from the chromatographic separation system and having a higher content of xylose on DS than the solution used as the feed.

The term "a fraction enriched in rhamnose" or "a rhamnose fraction" refers to a fraction recovered from a chromatographic separation system and having a higher content of rhamnose on DS than the solution used as the feed.

The term "DS" refers to the dissolved dry solids content expressed as weight-% or in g/100 ml.

The term "purity" refers to the content of a component (such as xylose and rhamnose) on DS.

"WBA resin" refers to a weak base anion exchange resin.
"SAC resin" refers to a strong acid cation exchange resin.
"WAC resin" refers to a weak acid cation exchange resin.
"SMB" refers to a chromatographic simulated moving bed system.

The term "a residual fraction" refers to a fraction which is collected from the chromatographic separation and which mainly contains components other than the product components.

"DVB" refers to divinylbenzene.

"MgSSL" refers to magnesium sulphite spent liquor, i.e. spent liquor obtained from magnesium sulphite pulping.

DETAILED DESCRIPTION OF THE INVENTION

The invention relates to a method of separating and recovering xylose from a xylose-containing plant-based solution, comprising performing the separation in a chromatographic separation system, which comprises one or more weak base anion exchange resins and optionally one or more other resins selected from strong acid cation exchange resins and weak acid cation exchange resins, by passing the solution through the separation system, and recovering at least one fraction enriched in xylose.

In connection with the present invention, said at least one fraction enriched in xylose typically refers to a fraction having a xylose content of more than 1.2 times, preferably more than 1.5 times and even more preferably more than 1.7 times that of the xylose containing plant-based solution used as the feed.

In one embodiment of the invention, the method may further comprises recovering other fractions, such as a fraction enriched in rhamnose. Furthermore, the method may comprise the recovery of more than one fraction enriched in xylose.

The separation resins are typically arranged in one or more separate chromatographic columns, which contain one or more compartments. Consequently, the columns may contain one compartment or several compartments.

Said one or more weak base anion exchange resins and each of said other resins may be arranged as mixed resins in a chromatographic column, or alternatively, each type of resin may be arranged separately in separate chromatographic columns. When a column contains several compartments, the different resins may be arranged in different compartments of the column.

In one embodiment of the invention, the separation is performed in a separation system, which comprises one or more weak base anion exchange resins alone.

In another embodiment of the invention, the separation is performed in a separation system, which comprises one or more weak base anion exchange resins and one or more strong acid cation exchange resins. The two resins may be arranged in a chromatographic column as a mixture or, alternatively, each resin may be arranged separately in separate chromatographic columns or in different compartments of a chromatographic column. The separation with the two resins may be performed in various ways. In one form of this embodiment of the invention, the separation comprises first a separation with said one or more strong acid cation exchange resins and then a separation with said one or more weak base anion exchange resins.

In a further embodiment of the invention, the separation is performed in a separation system, which comprises one or more weak base anion exchange resins and one or more weak acid cation exchange resins. As above, the two resins may be arranged in a chromatographic column as a mixture or, alternatively, each resin may be arranged separately in separate chromatographic columns or in different compartments of a chromatographic column. The separation with the two resins may be performed in various ways. In one form of this embodiment of the invention, the separation comprises first a separation with said one or more weak acid cation exchange resins and then a separation with said one or more weak base anion exchange resins.

The relation between the volume of said one or more weak base anion exchange resins to the volume of said other resins in the separation system may vary. In a typical embodiment of the invention, the resins in the separation system comprise less than 50% of the weak base anion exchange resin, the rest consisting of said other resin. The relation of the volume of the weak base anion exchange resin to that of the other resin may be in the range of 2:3 to 1:4, for example. In one practical embodiment of the invention, the separation system may comprise one column of a weak base anion exchange resin and four columns of a strong acid cation exchange resin, for example.

Weak Base Anion Exchange Resins (WBA Resins)

The WBA resins used in the invention are based on a resin selected from the group consisting of acrylic resins, polystyrene resins, epichlorohydrin-based anion exchange resins, aminated products of phenol or formaldehyde resins, aliphatic amines and ammonia polycondensation resins. In a preferred embodiment of the invention, the WBA resin is an acrylic resin, i.e. a resin with an acrylic matrix.

The acrylic WBA resins are preferably derived from acrylic esters ($H_2$=CR—COOR', where R is H or $CH_3$ and R' is alkyl group, like methyl, ethyl, isopropyl, butyl etc.), like methyl acrylate, ethyl acrylate, butyl acrylate, methyl methacrylate, acrylonitrile or acrylic acids or a mixture thereof. The acrylic matrix is crosslinked with a suitable crosslinker, which can be for example of aromatic type like divinylbenzene (DVB) or of aliphatic type, like isoprene, 1,7-octadiene, trivinylcyclohexane, diethylene glycol divinyl ether, N,N'-methylene-bis-acrylamide, N,N'-alkylene-bis-acrylamide, ethyleneglycol dimethacrylate and other di-, tri-, tetra-, pentaacrylate and pentamethacrylate. A suitable crosslinking degree with divinylbenzene is from 1 to 20 weight-% DVB, preferably from 4 to 10 weight-% DVB.

The acrylic WBA resins are manufactured of the crosslinked polyacrylic polymer by amination with a suitable amine like mono-, di-, tri-, tetra-, penta- or hexamines or other polyamines. For example dimethylamine, diethylene triamine, triethylene tetramine, tetraethylene pentamine, pentaethylene hexamine and dimethylaminopropylamine are suitable amines.

Polystyrene resins represent another form of WBA resins, which are useful in the present invention.

A further weak base anion exchange resin structure comprises epichlorohydrin-based polycondensation anion exchangers. The chloromethyl and epoxy group of epichlorohydrin react with polyamines forming crosslinked gel type anion exchangers. For example the condensation reaction of epichlorohydrin with triethyleneteramine results to an anion resin structure. This type of anion resin contains both weak base (tertiary amine) and strong base (quaternary ammonium) functional groups.

A still further class of WBA resins comprises aminated polycondensation products of phenol and formaldehyde.

A still further form of WBA resins is based on aliphatic amines and ammonia polycondensation resins. Cross-linked resin structures are formed when monomeric amines or ammonia are reacted for example with formaldehyde. The reaction between amine and formaldehyde forms methylol and/or azomethine groups, which can further react to form polycondensates. A well-known structure of this type is a resin from the reaction of formaldehyde, acetone and tetraethylenepentamine. Aromatic amines can also be cross-linked with formaldehyde resulting in a weak base anion exchanger.

Different types of cross-linked polyvinylpyridine based ion exchangers having pyridine as the functional group are also useful as WBA resins.

The average particle size of the WBA resins is normally 10 to 2000 micrometers, preferably 200 to 500 micrometers.

The WBA resins may be used in a multivalent, divalent or monovalent anion form, for example in a $SO_4^{2-}/SO_3^{2-}$-form. However, the ion form depends on the ionic composition of the separation feed solution.

The WBA resins may be regenerated to the desired anion form before separation.

Strong Acid Cation Exchange Resins (SAC Resins)

The SAC resins used in the invention may be in a multivalent, divalent or monovalent cation form.

The monovalent cation forms may be selected from $H^+$, $Na^+$ and $K^+$, for example. Examples of divalent cation forms are $Ca^{2+}$, $Mg^{2+}$, $Zn^{2+}$, $Sr^{2+}$ and $Ba^{2+}$. An example of a trivalent cation form is $Al^{3+}$.

In a preferred embodiment of the invention, the SAC resin is in a divalent cation form, preferably in a $Mg^{2+}$ or $Ca^{2+}$ form.

The SAC resins may be styrenic or acrylic resins having a crosslinking degree in the range of 1 to 20%, for example 4 to 10% DVB (divinylbenzene). The crosslinking agents may also be selected from those recited for weak base anion exchange resins above.

A typical mean particle size of the SAC resins is 200 to 450 μm.

The SAC resins are preferably in a gel form.

Weak Acid Cation Exchange Resins (WAC Resins)

The WAC resins are acrylic cation exchange resins, having carboxylic functional groups.

The acrylic WAC resin is typically derived from the group consisting of an acrylate ester, acrylonitrile, acrylic acids and mixtures thereof. The acrylate ester is selected from the group consisting of methyl methacrylate, methyl acrylate, ethyl acrylate and butyl acrylate.

The matrix of the WAC resins may also be other than acrylic.

The active functional groups of the WAC resins may also be other than carboxylic groups. They may be selected from other weak acids, for example.

The WAC resin may be in a $H^+$, $Na^+$, $K^+$, $Ca^{2+}$ or $Mg^{2+}$ form, preferably in a $H^+/Mg^{2+}$ form. Other ion forms may also be used.

The WAC resin is crosslinked with an aromatic cross-linker, preferably divinylbenzene (DVB). It may also be crosslinked with an aliphatic crosslinker, such as isoprene, 1,7-octadiene, trivinylcyclohexane, diethylene glycol divinylether. The crosslinking degree is from 1 to 20%, preferably from 3 to about 8% DVB.

The average particle size of the WAC resin is from 10 to 2000 μm, preferably from 100 to 400 μm.

Separation Conditions

The eluent for the chromatographic separation may be selected from water, an aqueous solution, an alcohol, an evaporation condensate and mixtures thereof. In one practical embodiment of the invention, the eluent is an evaporation condensate containing acetic acid.

In one embodiment of the invention, a portion of the eluent may be replaced by one or more fractions (parts of the separation profile) collected from the chromatographic separation. The fractions used as a substitute for the eluent may be residual fractions, for example.

The separation is performed at a temperature of 20 to 95° C., preferably 60 to 80° C.

The pH of the solution used as the feed is typically in an acidic pH range, preferably in the range of 2 to 5.

The separation is performed by a method selected from a simulated moving bed method, a batch method and combinations thereof. For example, the separation with one resin may be performed by a simulated moving bed method and the separation with another resin may be performed by a batch method.

The simulated moving bed method may be performed by a sequential method or a continuous method or combinations thereof.

The columns of the separation system may form one or more loops, whereby the different resins may be arranged in the same loop (in columns within the same loop) or in different loops (in columns within different loops).

The separation system may comprise one or more separation profiles in a loop.

Furthermore, the recovered xylose fractions and/or rhamnose fractions may be subjected to one or more further steps, such as evaporation, concentration, filtration, ion exchange, crystallization, intermediate crystallization, nanofiltration and chromatographic fractionation. The recovered xylose and rhamnose fractions may be treated in different ways, depending on the purity of the fractions.

Feed Materials

The xylose-containing plant-based solutions used as the starting materials in the chromatographic separation are typically multicomponent plant-based extracts or hydrolysates or derivatives thereof. Sulphite spent liquor can be mentioned as an example of suitable starting materials.

The plant-based hydrolysates may be obtained from vegetable material, including wood material from various wood species, particularly hardwood, such as birch, aspen and beech, maple, eucalyptus, various parts of grain (such as straw, especially wheat straw, husks, particularly corn and barley husks and corn cobs and corn fibers), bagasse, coconut shells, cottonseed skins, almond shells, etc. The plant-based extracts may be for example water, vapour, alkaline or alcohol extracts of the plants described above. Derivatives of plant-based hydrolysates and extracts may be different post-treated products, such as evaporation products thereof or fractions from membrane processes.

In one specific embodiment of the invention, the plant-based hydrolysate for the separation of xylose is a spent liquor obtained from a pulping process. A typical spent liquor useful in the present invention is a spent sulphite pulping liquor, which is preferably obtained from acid sulphite pulping. One example of a useful hydrolysate is a prehydrolysate from sulphate pulping.

In a further specific embodiment of the invention, xylose may be separated from a mother liquor obtained from the crystallization of xylose.

Purities and Yields

The xylose fraction recovered from the chromatographic separation in accordance with the invention has a purity of more than 45% on DS, preferably more than 55% on DS, specifically more than 60% on DS and most preferably more than 70% on DS.

The method provides a xylose yield of more than 80%, preferably at least 90%.

EXAMPLES

The following examples illustrate the invention without limiting the invention in any way.

Example 1. Chromatographic Batch Separation of Xylose with a WBA Resin (6-% DVB) from a Xylose-Containing Solution Obtained from MgSSL SMB Separation The test equipment included a separation column, a feed pump, a heat exchanger, inlet valves for the feed and the eluent as well as flow control means for the out-coming liquid. The column was packed with an acrylic weak base gel type anion exchange resin in $SO_4^{2-}$-form. The divinylbenzene (DVB) content of the resin was 6%. The mean bead size of the resin was 0.32 mm. The height of the chromatographic resin bed in the separation column was 1.34 m and the column had a diameter of 0.093 m.

As a feed, a xylose-containing solution obtained from MgSSL SMB separation was used and the aim was to separate the xylose contained therein.

Before the separation tests, the feed solution was filtered with a Büchner funnel and the feed dry substance content was adjusted to 25.1 g/100 g. The properties of the feed are set forth in the table below, whereby the percentages are given on a dry substance weight basis.

TABLE E1-I

Composition of the feed solution

| | |
|---|---|
| pH (as is) | 3.1 |
| Xylose, % on DS | 31.1 |
| Glucose, % on DS | 4.0 |
| Galactose + Rhamnose, % on DS | 3.5 |
| Mannose, % on DS | 2.9 |
| Others, % on DS | 58.5 |

The feed and the eluent were used at a temperature of 65° C. and water was used as eluent. The feed volume was 0.8 liters and the flow rate for the feed and elution was 3 l/h.

After equilibration of the system with several feeds, fraction series was collected and the HPLC analyses of the selected samples were carried out. According to the analyses results cut points for the following fractions were calculated: residual fraction, two recycle fractions (both sides of the xylose peak) and xylose product fraction. The result including HPLC analyses for the residual fraction, combined recycle fractions and the xylose fraction are set forth in the table below.

TABLE E1-II

| | Xylose | Comb. recycle | Residual |
|---|---|---|---|
| Volume, l | 1.0 | 0.6 | 4.8 |
| Dry solids, g/100 ml | 10.4 | 5.1 | 1.1 |
| Xylose, % on DS | 59.1 | 23.3 | 2.3 |
| Glucose, % on DS | 6.0 | 6.8 | 1.2 |
| Galactose + Rhamnose, % on DS | 4.5 | 7.3 | 1.4 |
| Mannose, % on DS | 4.3 | 5.2 | 0.8 |
| Others, % on DS | 26.0 | 64.0 | 94.3 |

The xylose purity of the xylose fraction was 59.1% on DS and the xylose yield calculated from the recovered fractions was 98.0%.

Example 2. Chromatographic SMB Separation of MgSSL with a Combination of SAC and WBA Resin The process equipment included five columns connected in series, feed pump, recycling pumps, eluent water pump, heat exchangers, flow control means for the out-coming liquids as well as inlet and product valves for the various process streams. The height of first three columns was 3.6 m and height of last two columns was 4.6 m and each column had a diameter of 0.11 m. First three columns were packed with a strong acid gel type cation exchange resin in $Mg^{2+}$-form. The divinylbenzene content of the resin was 6.5% and the mean bead size of the resin was 0.38 mm. Last two columns were packed with an acrylic weak base anion exchange resin in $SO_4^{2-}$-form. The divinylbenzene content of the resin was 8.0% and the mean bead size of the resin was 0.32 mm.

Before the separation, $Mg^{2+}$ sulphite spent liquor was pre-coat filtered by using Arbocel B800 as a filter aid. Feed dry substance was then adjusted with a recycle fraction to 48.4 g/100 g and the feed liquor pH was 3.3. The feed was composed as set forth below, whereby the percentages are given on a dry substance weight basis.

TABLE E2-I

Composition of the feed

| | |
|---|---|
| Glucose, % on DS | 2.8 |
| Xylose, % on DS | 18.6 |
| Galactose + rhamnose, % on DS | 2.2 |
| Arabinose + mannose, % on DS | 2.8 |
| Xylonic acid, % on DS | 4.8 |
| Others, % on DS | 68.8 |

The fractionation was performed by way of a 9-step SMB sequence as set forth below. The aim of the separation was to separate xylose contained therein. The feed and the eluent were used at a temperature of 65° C. and 2 weight-% acetic acid solution was used as an eluent.

Step 1: 3.8 l of feed solution were pumped into the first column at a flow rate of 40 l/h and a recycle fraction was collected from the third column. Simultaneously 2.0 l were circulated in the column loop, formed with columns four and five, at a flow rate of 25 l/h.

Step 2: 8.0 l of feed solution were pumped into the first column at a flow rate of 50 l/h and a residual fraction was collected from the same column. Simultaneously 5.8 l of eluent were pumped into the second column at a flow rate of 36 l/h and a recycle fraction was collected from the last column.

Step 3: 5.0 l of feed solution were pumped into the first column at a flow rate of 40 l/h and first 1.5 l of recycle fraction and then 3.5 l of xylose fraction were collected from the last column.

Step 4: 5.9 l of feed solution were pumped into the first column at a flow rate of 40 l/h and a residual fraction was collected from the fourth column. Simultaneously 4.7 l of eluent were pumped into the last column at a flow rate of 32 l/h and first 4.3 l of xylose fraction and then 0.4 l of recycle fraction were collected from the same column.

Step 5: 2.1 l of feed solution were pumped into the first column at a flow rate of 50 l/h and a residual fraction was collected from the second column. Simultaneously 0.1 l of eluent were pumped into the fifth column at a flow rate of 20 l/h and a residual fraction was collected from the fourth column. Column three was waiting for the next step.

Step 6: 8.7 l of eluent were pumped into the third column at a flow rate of 62 l/h and a residual fraction was collected from the second column. Simultaneously 15.0 l were circulated in the column loop, formed with columns four and five, at a flow rate of 50 l/h.

Step 7: 11.3 l were circulated in the column loop, formed with columns one and two and three, at a flow rate of 62 l/h. Simultaneously circulation in the column loop, formed with columns four and five, was continued at a flow rate of 35 l/h.

Step 8: 10.9 l of eluent were pumped into the first column at a flow rate of 63 l/h and a residual fraction was collected from the third column. Simultaneously 5.0 l of eluent were pumped into the fourth column at a flow rate of 40 l/h and a residual fraction was collected from the last column.

Step 9: 7.4 l were circulated in the column loop, formed with columns one and two and three, at a flow rate of 62 l/h. Simultaneously 2.5 l were circulated in the column loop, formed with columns four and five, at a flow rate of 35 l/h.

After equilibration of the system, the following fractions were drawn from the system: a residual fraction from all columns, recycle fractions from third and fifth column and xylose product fractions from the last column. The result including HPLC analyses for the combined residual, recycle and xylose fractions are set forth in the table below.

TABLE E2-II

|  | Combined residual | Combined recycle | Combined xylose |
|---|---|---|---|
| Volume, l | 40.7 | 11.5 | 7.8 |
| Dry solids, weight-% | 20.8 | 30.3 | 29.0 |
| Dry solids, g/100 ml | 22.3 | 33.9 | 32.3 |
| Glucose, % on DS | 1.0 | 5.6 | 4.2 |
| Xylose, % on DS | 0.9 | 28.8 | 61.5 |
| Galactose + rhamnose, % on DS | 0.5 | 3.9 | 4.6 |
| Arabinose + mannose, % on DS | 0.5 | 4.8 | 6.5 |
| Xylonic acid, % on DS | 5.3 | 3.7 | 3.5 |
| Others, % on DS | 91.8 | 53.2 | 19.7 |

The purity of the xylose fraction was 61.5% on DS and the overall xylose yield calculated from the recovered fractions was 95.0%. From the result it can be calculated that 84.5% of the xylonic acid was removed in the separation.

Before the product crystallization, the xylose fraction obtained from the separation may be subjected to further purification processes like evaporation, ion exchange, chromatographic separation, nanofiltration or intermediate crystallization. It may be also subjected, after evaporation, directly to the product crystallization to obtain crystalline xylose.

Example 3. (Reference) Chromatographic SMB Separation of MgSSL with SAC Resin

The process equipment included five columns connected in series, feed pump, recycling pumps, eluent water pump, heat exchangers, flow control means for the out-coming liquids as well as inlet and product valves for the various process streams. The height of first three columns was 3.6 m and height of last two columns was 4.6 m and each column had a diameter of 0.11 m. All columns were packed with a strong acid gel type cation exchange resin in $Mg^{2+}$-form. The divinylbenzene content of the resin was 6.5% and the mean bead size of the resin was 0.38 mm.

Before the separation, $Mg^{2+}$ sulphite spent liquor was pre-coat filtered by using Arbocel B800 as a filter aid. Feed dry substance was then adjusted with a recycle fraction to 48.9 g/100 g and the feed liquor pH was 3.1. The feed was composed as set forth below, whereby the percentages are given on a dry substance weight basis.

TABLE E3-I

| Composition of the feed | |
|---|---|
| Glucose, % on DS | 2.5 |
| Xylose, % on DS | 18.8 |
| Galactose + rhamnose, % on DS | 2.1 |
| Arabinose + mannose, % on DS | 2.4 |
| Xylonic acid, % on DS | 5.5 |
| Others, % on DS | 68.7 |

The fractionation was performed by way of a 9-step SMB sequence as set forth below. The aim of the separation was to separate xylose contained therein. The feed and the eluent were used at a temperature of 65° C. and 2 weight-% acetic acid solution was used as an eluent.

Step 1: 3.8 l of feed solution were pumped into the first column at a flow rate of 40 l/h and a recycle fraction was collected from the third column. Simultaneously 2.0 l were circulated in the column loop, formed with columns four and five, at a flow rate of 25 l/h.

Step 2: 8.0 l of feed solution were pumped into the first column at a flow rate of 50 l/h and a residual fraction was collected from the same column. Simultaneously 5.8 l of eluent were pumped into the second column at a flow rate of 37 l/h and a recycle fraction was collected from the last column.

Step 3: 4.5 l of feed solution were pumped into the first column at a flow rate of 50 l/h and a xylose fraction was collected from the last column.

Step 4: 6.4 l of feed solution were pumped into the first column at a flow rate of 50 l/h and residual fraction was collected from the fourth column. Simultaneously 8.5 l of eluent were pumped into the last column at a flow rate of 65 l/h and first 7.0 l of xylose fraction and then 1.5 l of recycle fraction were collected from the same column.

Step 5: 2.1 l of feed solution were pumped into the first column at a flow rate of 50 l/h and a residual fraction was collected from the second column. Simultaneously 0.8 l of eluent were pumped into the fifth column at a flow rate of 20 l/h and residual fraction was collected from the fourth column. Column three was waiting for the next step.

Step 6: 7.6 l of eluent was pumped into the third column at a flow rate of 65 l/h and a residual fraction was collected from the second column. Simultaneously 15.1 l were circulated in the column loop, formed with columns four and five, at a flow rate of 50 l/h.

Step 7: 11.3 l were circulated in the column loop, formed with columns one and two and three, at a flow rate of 65 l/h. Simultaneously circulation in the column loop, formed with columns four and five, was continued at a flow rate of 50 l/h.

Step 8: 9.9 l of eluent were pumped into the first column at a flow rate of 65 l/h and a residual fraction was collected from the third column. Simultaneously 8.1 l of eluent were pumped into the fourth column at a flow rate of 55 l/h and a residual fraction was collected from the last column.

Step 9: 7.7 l were circulated in the column loop, formed with columns one and two and three, at a flow rate of 65 l/h. Simultaneously 3.5 l were circulated in the column loop, formed with columns four and five, at a flow rate of 35 l/h.

After equilibration of the system, following fractions were drawn from the system: a residual fraction from all columns, recycle fractions from third and fifth column and xylose product fractions from the last column. The result including HPLC analyses for the combined residual, recycle and xylose fractions are set forth in the table below.

TABLE E3-II

|  | Combined residual | Combined recycle | Combined xylose |
|---|---|---|---|
| Volume, l | 42.9 | 11.1 | 11.5 |
| Dry solids, weight-% | 20.0 | 26.0 | 28.3 |
| Dry solids, g/100 ml | 21.5 | 28.5 | 31.4 |
| Glucose, % on DS | 0.7 | 5.4 | 3.9 |
| Xylose, % on DS | 0.6 | 28.3 | 52.8 |
| Galactose + rhamnose, % on DS | 0.2 | 3.4 | 5.2 |
| Arabinose + mannose, % on DS | 0.2 | 3.7 | 5.9 |
| Xylonic acid, % on DS | 2.6 | 8.0 | 9.5 |
| Others, % on DS | 95.7 | 51.2 | 22.7 |

The purity of the xylose fraction was 52.8% on DS and the overall xylose yield calculated from the recovered fractions was 97.2%. From the result it can be calculated that 41.1% of the xylonic acid was removed in the separation.

Before the product crystallization, the xylose fraction obtained from the separation may be subjected to further purification processes like evaporation, ion exchange, chromatographic separation, nanofiltration or intermediate crystallization.

Example 4. Chromatographic Batch Separation of Xylose with a WBA Resin (6-% DVB) from a Xylose-Containing Crystallization Mother Liquor The test equipment as described in example 1 was used. As a feed, xylose-containing crystallization mother liquor was used and the aim was to separate the xylose contained therein.

Before the separation tests, the feed solution was filtered with a Büchner funnel and the feed dry substance content was adjusted to 25.9 g/100 g. The properties of the feed are set forth in the table below, whereby the percentages are given on a dry substance weight basis.

TABLE E4-I

| Composition of the feed solution | |
|---|---|
| pH (as is) | 3.4 |
| Xylose, % on DS | 25.9 |
| Glucose, % on DS | 8.4 |
| Galactose + Rhamnose, % on DS | 8.4 |
| Mannose, % on DS | 7.8 |
| Others, % on DS | 49.5 |

Separations and the fraction series collection were carried out similarly than in Example 1.

The results for the residual fraction, recycle fractions and the xylose fraction are set forth in the table below.

TABLE E4-II

|  | Xylose | Comb. recycle | Residual |
|---|---|---|---|
| Volume, l | 0.60 | 0.7 | 2.40 |
| Dry solids, g/100 ml | 13.3 | 8.6 | 0.98 |
| Xylose, % on DS | 46.7 | 27.0 | 3.9 |
| Glucose, % on DS | 10.2 | 11.0 | 0.2 |
| Galactose + Rhamnose, % on DS | 8.0 | 11.8 | 0.0 |
| Mannose, % on DS | 9.3 | 10.3 | 0.3 |
| Others, % on DS | 25.7 | 50.9 | 95.7 |

The xylose purity of the xylose fraction was 46.7% and the xylose yield calculated from the recovered fractions was 90.9%.

Example 5. Chromatographic SMB Separation of a Xylose Crystallization Mother Liquor Using a Combination of WAC and WBA Resin The process equipment included five columns connected in series, feed pump, recycling pumps, eluent water pump, heat exchangers, flow control means for the out-coming liquids as well as inlet and product valves for the various process streams. The height of first three columns was 3.6 m and height of last two columns was 4.6 m and each column had a diameter of 0.11 m.

First three columns were packed with a weak acid gel type cation exchange resin in $H^+/Mg^{2+}$-form. The divinylbenzene content of the resin was 8% and the mean bead size of the resin was 0.35 mm. Last two columns were packed with an acrylic weak base anion exchange resin in $SO_4^{2-}$-form. The divinylbenzene content of the resin was 8.0% and the mean bead size of the resin was 0.32 mm.

Before the separation, the crystallization mother liquor was pre-coat filtered by using Arbocel B800 as a filter aid. Feed dry substance was then adjusted with a recycle fraction to 48 g/100 g and the feed liquor pH was 2.9. The feed was composed as set forth below, whereby the percentages are given on a dry substance weight basis.

TABLE E5-I

| Composition of the feed | |
|---|---|
| Glucose, % on DS | 8.7 |
| Xylose, % on DS | 28.2 |
| Rhamnose, % on DS | 2.4 |
| Other sugars, % on DS | 11.5 |
| Xylonic acid, % on DS | 18.1 |
| Others, % on DS | 31.1 |

The fractionation was performed by way of a 9-step SMB sequence as set forth below. The aim of the separation was to separate xylose and rhamnose contained therein. The feed and the eluent were used at a temperature of 65° C. and ion exchanged water was used as an eluent.

Step 1: 8.0 l of feed solution were pumped into the first column at a flow rate of 50 l/h and a residual fraction was collected from the same column. Simultaneously 8.0 l of eluent were pumped into the second column at a flow rate of 55 l/h and first 5.2 l of recycle fraction and then 2.8 l of xylose fraction were collected from the last column.

Step 2: 1.5 l of feed solution were pumped into the first column at a flow rate of 50 l/h and xylose fraction were collected from the last column.

Step 3: 4.5 l of feed solution were pumped into the first column at a flow rate of 50 l/h and a residual fraction was collected from the fourth column. Simultaneously 4.5 l of eluent were pumped into the last column at a flow rate of 40 l/h and first 4.1 l of xylose fraction and then 0.4 l of recycle fraction were collected from the same column.

Step 4: 5.2 l were circulated in the column loop, formed with columns one and two and three, at a flow rate of 70 l/h. Simultaneously 0.3 l of eluent were pumped into the fifth column at a flow rate of 30 l/h and a residual fraction was collected from the column four.

Step 5: 0.5 l of eluent were pumped into the third column at a flow rate of 80 l/h and a residual fraction was collected from the second column. Simultaneously 17.8 l were circulated in the column loop, formed with columns four and five, at a flow rate of 36 l/h.

Step 6: 8.4 l of eluent were pumped into the first column at a flow rate of 70 l/h and a residual fraction was collected from the second column. Simultaneously 8.0 l of eluent were pumped into the third column at a flow rate of 63 l/h and a rhamnose fraction was collected from the same column. Also simultaneously circulation in the column loop, formed with columns four and five, was continued at a flow rate of 36 l/h.

Step 7: 11.4 l were circulated in the column loop, formed with columns one and two and three, at a flow rate of 75 l/h. Simultaneously circulation in the column loop, formed with columns four and five, was continued at a flow rate of 36 l/h.

Step 8: 9.1 l of eluent were pumped into the first column at a flow rate of 80 l/h and a residual fraction was collected from the third column. Simultaneously 4.9 l of eluent were pumped into the fourth column at a flow rate of 45 l/h and a residual fraction was collected from the last column.

Step 9: 11.4 l were circulated in the column loop, formed with columns one and two and three, at a flow rate of 70 l/h. Simultaneously 8.5 l were circulated in the column loop, formed with columns four and five, at a flow rate of 55 l/h.

After equilibration of the system, the following fractions were drawn from the system: a residual fraction from all columns, rhamnose fraction from third column, recycle fractions from fifth column and xylose product fractions from the last column. The result including HPLC analyses for the combined residual, rhamnose, recycle and xylose fractions are set forth in the table below.

TABLE E5-II

|  | Combined residual | Combined recycle | Combined xylose | Combined rhamnose |
|---|---|---|---|---|
| Volume, l | 35.7 | 5.6 | 8.4 | 8.0 |
| Dry solids, weight-% | 7.3 | 29.3 | 32.5 | 4.7 |
| Dry solids, g/100 ml | 7.5 | 32.7 | 36.7 | 4.7 |
| Glucose, % on DS | 9.6 | 11.7 | 7.4 | 1.0 |
| Xylose, % on DS | 4.2 | 33.0 | 49.1 | 10.3 |
| Rhamnose, % on DS | 0.3 | 1.6 | 3.5 | 12.4 |
| Other sugars, % on DS | 9.0 | 15.7 | 13.1 | 3.8 |
| Xylonic acid, % on DS | 30.1 | 14.5 | 10.5 | 21.9 |
| Others, % on DS | 46.9 | 23.5 | 16.4 | 50.6 |

The purity of the xylose fraction was 49.1% on DS and the overall xylose yield calculated from the recovered fractions was 91.0%. The xylose fraction obtained from separation may be subjected to further purification process to produce crystalline xylose. From the result it can be calculated that 73.2% of the xylonic acid was removed in the separation.

The purity of the rhamnose fraction was 12.4% on DS and the overall rhamnose yield calculated from the recovered fractions was 28.7%. The rhamnose fraction obtained from the separation may be subjected to further purification processes to produce crystalline rhamnose. From the results it can be calculated that the recovery of rhamnose fraction had only a minor effect to the overall xylose yield. Recovery of rhamnose can be easily improved by adjusting the separation feed volume or accepting a lower xylose yield.

Example 6. (Reference) Chromatographic SMB Separation of a Xylose Crystallization Mother Liquor Using a WAC Resin The process equipment included three columns connected in series, a feed pump, recycling pumps, an eluent water pump, heat exchangers, flow control means for the outcoming liquids as well as inlet and product valves for the various process streams. The height of all columns was 3.6 m and each column had a diameter of 0.11 m.

Columns were packed with a weak acid gel type cation exchange resin in $H^+/Mg^{2+}$-form. The divinylbenzene content of the resin was 8% and the mean bead size of the resin was 0.28 mm.

Before the separation, the crystallization mother liquor was pre-coat filtered by using Arbocel B800 as a filter aid. Feed dry substance was then adjusted with ion exchanged water to 47.2 g/100 g and the feed liquor pH was 2.5. The feed was composed as set forth below, whereby the percentages are given on a dry substance weight basis.

TABLE E6-I

Composition of the feed solution

| Glucose, % on DS | 6.3 |
|---|---|
| Xylose, % on DS | 25.9 |
| Rhamnose, % on DS | 3.1 |
| Other sugars, % on DS | 9.9 |
| Others, % on DS | 54.8 |

The fractionation was performed by way of a 15-step SMB sequence as set forth below. The aim of the separation was to separate xylose and rhamnose contained therein. The feed and the eluent were used at a temperature of 65° C. and ion exchanged water was used as an eluent.

Step 1: 7.5 l of feed solution were pumped into the first column at a flow rate of 45 l/h and a residual fraction was collected from the same column. Simultaneously 7.4 l of eluent were pumped into the second column at a flow rate of 44 l/h and xylose fraction was collected from the third column.

Step 2: 3.0 l of feed solution were pumped into the first column at a flow rate of 45 l/h and xylose fraction was collected from the third column.

Step 3: 2.3 l were circulated in the column loop, formed with all columns, at a flow rate of 45 l/h.

Step 4: 4.5 l of eluent were pumped into the third column at a flow rate of 70 l/h and a rhamnose fraction was collected from the same column. Other two columns waited for the next step.

Step 5: 4.4 l were circulated in the column loop, formed with all columns, at a flow rate of 45 l/h.

Step 6: 8.0 l of eluent were pumped into the third column at a flow rate of 45 l/h and a residual fraction was collected from the second column.

Step 7: 9.7 l were circulated in the column loop, formed with all columns, at a flow rate of 45 l/h.

Step 8: 9.4 l of eluent were pumped into the first column at a flow rate of 45 l/h and a residual fraction was collected from the third column.

Step 9: 9.7 l were circulated in the column loop, formed with all columns, at a flow rate of 50 l/h.

Step 10: 8.7 l of eluent were pumped into the second column at a flow rate of 55 l/h and a residual fraction was collected from the first column.

Step 11: 9.7 l were circulated in the column loop, formed with all columns, at a flow rate of 55 l/h.

Step 12: 7.2 l of eluent were pumped into the third column at a flow rate of 55 l/h and a residual fraction was collected from the second column.

Step 13: 9.7 l were circulated in the column loop, formed with all columns, at a flow rate of 55 l/h.

Step 14: 8.6 l of eluent were pumped into the first column at a flow rate of 55 l/h and a residual fraction was collected from the third column.

Step 15: 9.7 l were circulated in the column loop, formed with all columns, at a flow rate of 55 l/h.

After equilibration of the system, following fractions were drawn from the system: two residual fractions from all columns, xylose product fractions from the third column and rhamnose fraction from third column. The result including HPLC analyses for the combined residual, xylose and rhamnose fractions are set forth in the table below.

TABLE E6-II

|  | Combined residual | Combined xylose | Combined rhamnose |
|---|---|---|---|
| Volume, l | 49.4 | 10.4 | 4.5 |
| Dry solids, weight-% | 4.1 | 31.7 | 14.7 |
| Dry solids, g/100 ml | 4.1 | 35.8 | 15.5 |
| Glucose, % on DS | 11.4 | 4.3 | 0.4 |
| Xylose, % on DS | 6.9 | 36.7 | 15.7 |
| Rhamnose, % on DS | 0.1 | 2.4 | 15.9 |
| Other sugars, % on DS | 8.4 | 12.2 | 4.7 |
| Others, % on DS | 73.2 | 44.4 | 63.3 |

The purity of the xylose fraction was only 36.7% on DS and overall xylose yield calculated from the recovered fractions was 84.6%.

The purity of the rhamnose fraction was 15.9% on DS and the overall rhamnose yield calculated from the recovered fractions was 54.8%. The rhamnose fraction obtained from the separation can be subjected to a further purification process to produce crystalline rhamnose. From the results it can be calculated that recovery of rhamnose fraction had significant effect to the overall xylose yield.

It will be obvious to a person skilled in the art that, as the technology advances, the inventive concept can be implemented in various ways. The invention and its embodiments are not limited to the examples described above but may vary within the scope of the claims.

The invention claimed is:

1. A method of separating and recovering xylose from a xylose containing plant-based solution, comprising:
performing the separation in a chromatographic separation system, which comprises one or more weak base anion exchange resins or a combination thereof and optionally one or more other resins selected from strong acid cation exchange resins and weak acid cation exchange resins, by passing the solution through the separation system; and
recovering at least one fraction enriched in xylose wherein the recovered xylose fraction has a xylose purity of more than 45% on dissolved dry solids based on weight %.

2. The method according to claim 1, wherein if the chromatographic separation system comprises one or more weak base anion exchange resins in combination with one or more weak acid cation exchange resins, the method further comprises recovering a fraction enriched in rhamnose.

3. The method according to claim 2, wherein the yield of the fraction enriched in rhamnose recovered is at least 15%.

4. The method according to claim 1, wherein the separation comprises first a separation with said one or more strong acid cation exchange resins and then a separation with said one or more weak base anion exchange resins.

5. The method according to claim 1, wherein the separation comprises first a separation with said one or more weak acid cation exchange resins and then a separation with said one or more weak base anion exchange resins.

6. The method according to claim 1, wherein said one or more weak base anion exchange resins and each of said other resins are arranged in one or more separate columns with one or more compartments.

7. The method according to claim 1, wherein the strong acid cation exchange resin is in a multivalent, divalent, or monovalent cation form.

8. The method according to claim 1, wherein the weak base anion exchange resin is based on a resin selected from the group consisting of acrylic resins, polystyrene resins, epichlorohydrin based anion exchange resins, aminated products of phenol or formaldehyde resins, aliphatic amines, and ammonia polycondensation resins.

9. The method according to claim 8, wherein the weak base anion exchange resin is a resin with an acrylic matrix.

10. The method according to claim 9, wherein the weak acid cation exchange resin is in a H+, Na+, K+, Ca2+, Mg2+, or combination thereof form.

11. The method according to claim 1, wherein the resins are crosslinked with an aromatic crosslinker.

12. The method according to claim 1, wherein the eluent for the chromatographic separation is selected from water, an aqueous solution, an alcohol, an evaporation condensate, an evaporation condensate containing acetic acid, or mixtures thereof.

13. The method according to claim 12, wherein a portion of the eluent is replaced by one or more fractions collected from the chromatographic separation.

14. The method according to claim 1, wherein the separation is performed at a temperature of 20° C. to 95° C.

15. The method as claimed in claim 1, wherein the separation is performed by a method selected from a sequential simulated moving bed method, continuous simulated moving bed method, a batch method or combinations thereof.

16. The method as claimed in claim 1, wherein the separation system comprises one or more loops and different resins are arranged in the same loop or in different loops.

17. The method as claimed in claim 16, wherein the separation system comprises one or more separation profiles in a loop.

18. The method as claimed in claim 1, wherein the method provides a xylose yield of more than 80%.

19. The method according to claim 1, wherein the xylose-containing plant-based solution used as the feed is selected from plant-based hydrolysates, plant-based extracts, or derivatives thereof.

20. The method as claimed in claim 19, wherein the plant-based hydrolysate is a spent liquor obtained from a pulping process, hardwood pulping, or sulphite pulping.

21. The method as claimed in claim 19, wherein the xylose-containing plant-based solution used as the feed is a mother liquor obtained from the crystallization of xylose.

22. The method according to claim 7, wherein the strong acid cation exchange resin is in a divalent cation form, wherein said form is a Mg2+ or Ca2+ form.

23. The method according to claim 10, wherein the weak acid cation exchange resin is a resin with an acrylic matrix in a H+/Mg2+ form.

24. The method according to claim 13, wherein a portion of the eluent is replaced by one or more residual fractions collected from the chromatographic separation.

25. The method according to claim 14, wherein the separation is performed at a temperature of 60° to 80° C.

* * * * *